INVENTOR.
HENRY R. CHOPE
BY Lowe & King
ATTORNEYS

# United States Patent Office 3,553,991
Patented Jan. 12, 1971

3,553,991
NONLINEAR CONTROLLER
Henry Roy Chope, Columbus, Ohio, assignor to Industrial Nucleonics Corporation, a corporation of Ohio
Filed Apr. 30, 1968, Ser. No. 725,291
Int. Cl. B21b 37/12
U.S. Cl. 72—8     29 Claims

ABSTRACT OF THE DISCLOSURE

A rolling mill controller is driven for variable ON times in response to the deviation from a set point value in thickness of a sheet emerging from the mill, as well as the inertia characteristics of the mill and the back force properties of the material. The back force characteristics of the material are determined as a nonlinear function of the thickness of the material upstream of the rolling mill and the inherent material properties.

---

The present invention relates generally to systems and methods for controlling a material parameter and, more particularly, to a control system and method of said class wherein a property of a material being fed to a processing device establishes a nonlinear function related to a material characteristic.

I have found that in material processors, improved results can be attained by establishing a nonlinear control function in response to a material property analysis made prior to the processing step. The function establishes a nonlinear relation between an error signal derived after the material has been processed and the amount by which the processor is to be activated to produce a product having desired characteristics.

The invention has particular utility, for example, in steel rolling mills in conjunction with determining the amount by which the mill rolls shoud be driven to attain a desired thickness. A function of the steel back force can be established by monitoring the thickness of the material being fed into the material thickness reducing machine. The material thickness as measured, for example, by a nucleonic thickness gauge, and inherent properties of the material, such as shear modulus of elasticity, are related to the material back force by a nonlinear function. The nonlinear back force function is combined with a nonlinear function of the inertia characteristics of the machine to derive a composite nonlinear function. The composite nonlinear function enables an indication to be derived of the ON time required to activate a machine controller to correct for deviations between the thickness of the material emerging from the machine and a preset value.

According to another aspect of the nonlinear controller of the present invention, the OFF period of the controller is related to the transport lag between the processor and a gauge positioned downstream thereof for deriving the deviation indication. Thereby, the ON and OFF times of the controller are respectively varied in response to properties of the material being fed into, as well as out of, the processor and the transport lag between the processor and the gauge downstream thereof.

In accordance with one embodiment of the invention, the controller is activated for times precisely equal to the indications derived from the two thickness gauges and the sheet transport lag time. In accordance with another embodiment of the invention, possible overshoot of the controller is obviated by activating it to the ON and OFF states for identical fractions of the time indications derived from a nonlinear function generator responsive to the two gauge output signals and the sheet transport lag time.

It is, accordingly, an object of the present invention to provide a new and improved system for and method of controlling material processors.

Another object of the present invention is to provide a system for and method of determining the correction required for a controller of a material processor by establishing nonlinear functions in response to a property of material fed into the processor.

A further object of the present invention is to provide a system for and method of actuating a controller of a sheet thickness reducing machine in response to a nonlinear function of the thickness of the material being fed into and from the machine.

Another object of the invention is to provide a system for and method of deriving a control signal indicative of the amount of correction required to enable a sheet thickness reducing machine to produce a sheet having a desired thickness, wherein the control indication is derived as a nonlinear function of the material thickness and inherent properties, as well as the time response of the machine.

An additional object of the invention is to provide a system for and method of measuring material back force in response to a nonlinear function of material thickness.

Still another object of the invention is to provide a new and improved system for and method of actuating a material process controller in response to: a property of the material being fed to and emerging from the processor; and the transport lag between the processor and a gauge measuring a property of the material emerging from the processor.

The above and still further objects, features and advantages of the present invention will become apparent upon consideration of the following detailed description of one specific embodiment thereof, especially when taken in conjunction with the accompanying drawings, wherein.

The present invention is described in detail in conjunction with a system for controlling a reversing steel rolling mill. It is to be understood, however, that the principles of the invention are applicable to controlling other types of processes, such as a plastic extruder, a rubber calender or a tandem steel rolling mill.

Figure 1:
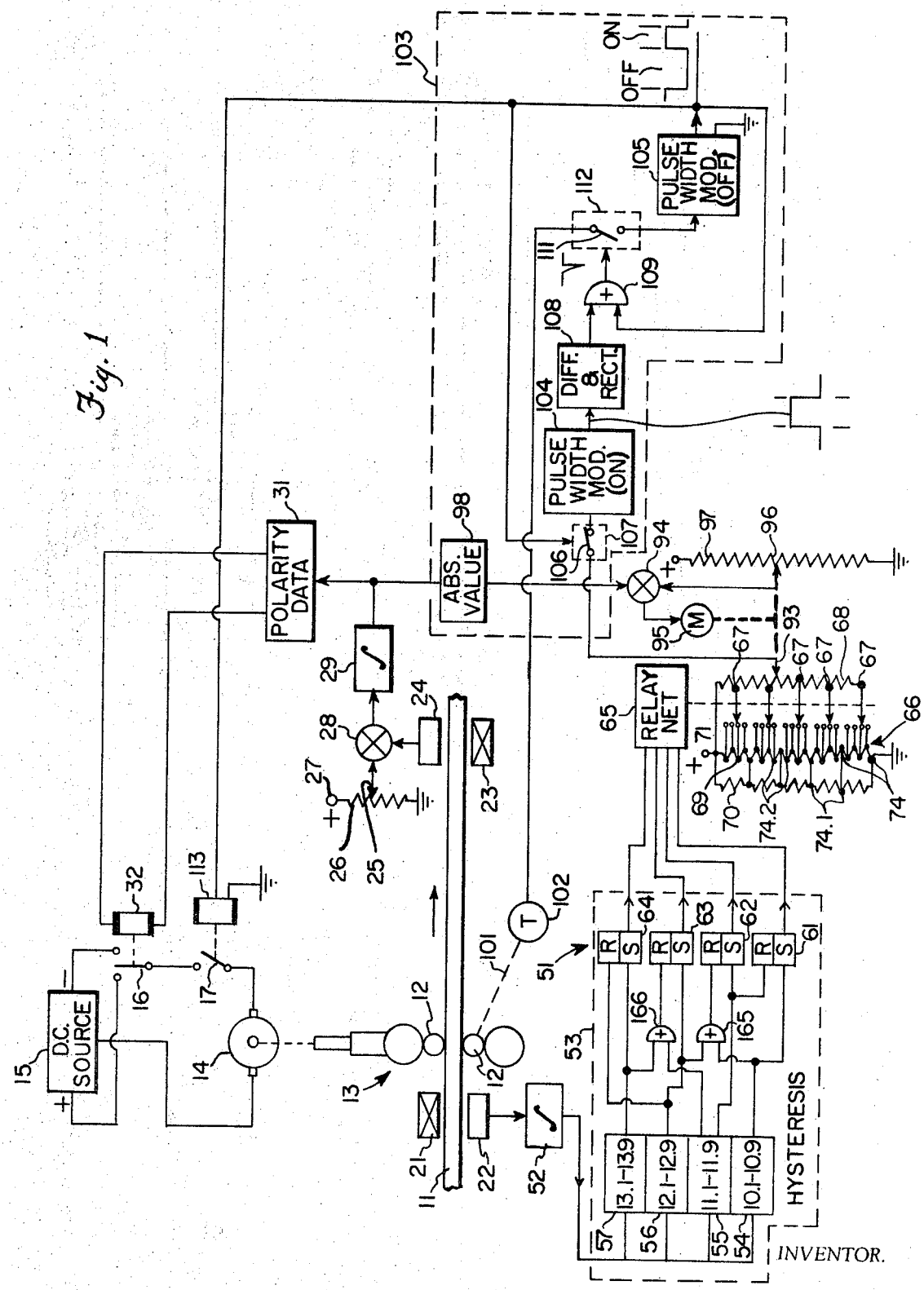
FIG. 1 is a schematic diagram illustrating one preferred embodiment of the present invention.

Reference is now made to FIG. 1 of the drawings wherein steel sheet 11 is transported from left to right through a reversing rolling mill 13 including rollers 12. Rollers 12 are urged together by the shaft of D.C. motor 14 so that the sheet emerging from rolling mill 13 has a predetermined thickness. To control the separation between rollers 12 and hence the thickness of sheet 11 downstream of rolling mill 13, power is supplied to the armature of motor 14 by D.C. source 15, connected in bipolarity relationship with the armature of motor 14 via series connected contacts 16 and 17. To increase and decrease the separation between rollers 12, contacts 16 selectively connect one of the terminals of motor 14 to the positive and negative terminals of D.C. source 15, while a center tap point on the source is permanently connected to the other terminal of the motor. Contact 17 is closed for varying time intervals, depending upon the required separation between rollers 12 necessary to achieve the desired thickness of the sheet 11. Motor 14 is thereby activated to variable ON and OFF time periods in response to contact 17 being closed and opened by control apparatus to be described.

Motor 14 is driven with power from source 15 for variable time periods, i.e., the motor has variable ON periods, in accordance with parameters indicative of the characteristics of the rolling mill and the back force of sheet 11 to the rolling mill. The back force is determined by two factors, namely: the thickness of sheet 11 as it passes into rolling mill 13; and the inherent properties of steel which are ascertained on an a priori basis, such as shear modulus of elasticity.

The back force component indicative of the thickness of the sheet being fed to rolling mill 13 is determined with a thickness gauge comprising nuclear penetrating radiation source 21 and nuclear detector 22, positioned upstream of rollers 12. To determine if the sheet 11 emerging from rolling mill 13 has been decreased in thickness to the desired dimension, nuclear penetrating radiation source 23 and nuclear detector 24 are positioned downstream of rollers 12. Preferably, radiation sources 21 and 23 are of the penetrating radiation type, such as gamma ray sources, and detectors 22 and 24 are positioned on opposite sides of sheet 11 from their associated radiation sources. Each of detectors 22 and 24 includes circuitry of a conventional type to derive a D.C. output voltage directly proportional to the thickness of sheet 11 as it passes the respective thickness radiation gauge stations.

To derive a signal indicative of the deviation between a desired thickness and the thickness of the sheet emerging from rolling mill 13, the output of radiation detector 24 is compared with a voltage of predetermined value. To this end, a set point signal is derived at slider 25 of potentiometer 26, having terminal 27 excited with a D.C. voltage. The D.C. voltage at slider 25 is compared with the D.C. output voltage of detector 24 in subtraction network 28, which derives an error signal that is fed to D.C. analog integrator 29. Integrator 29 has a time constant selected to remove the high frequency noise from the output of detector 24, and hence functions as a low pass filter deriving an output signal indicative of the difference between the actual thickness of sheet 11 emerging from rolling mill 13 and a set point value.

For positive and negative error signals, the separation of rollers 12 is respectively increased and decreased. To this end, the output of integrator 29 is fed to polarity detector 31. Detector 31 is an infinite clipper for deriving relatively constant amplitude, but opposite polarity signals in response to the output voltage of integrator 29 being positive and negative. The bipolarity output voltage of detector 31 is fed to polarized relay winding 32 that actuates relay contact 16 to connections with the positive and negative terminals of source 15. Thereby, if the thickness of sheet 11 emerging from rolling mill 13 is greater than desired, causing a negative output voltage of integrator 29, contact 16 engages the negative terminal of source 15 whereby rollers 12 are driven toward each other by the shaft of motor 14; the rollers are driven away from each other by contact 16 engaging the positive terminal of source 15 in response to a positive output voltage of integrator 29 being coupled to polarity detector 31.

The time duration that the voltage on contact 16 is coupled to armature 14 is controlled by the closure or ON period of contact 17, which in turn is determined by: the thickness signal derived from detector 22; the characteristics of the steel comprising sheet 11; the characteristics of rolling mill 13; and the magnitude of the error signal derived from integrator 29. The error signal is related to the closure duration of contacts 17 for a pair of exemplary rolling mill machines and steels as indicated by the plots of FIG. 2, wherein ON time is plotted as a function of error.

Figure 2:
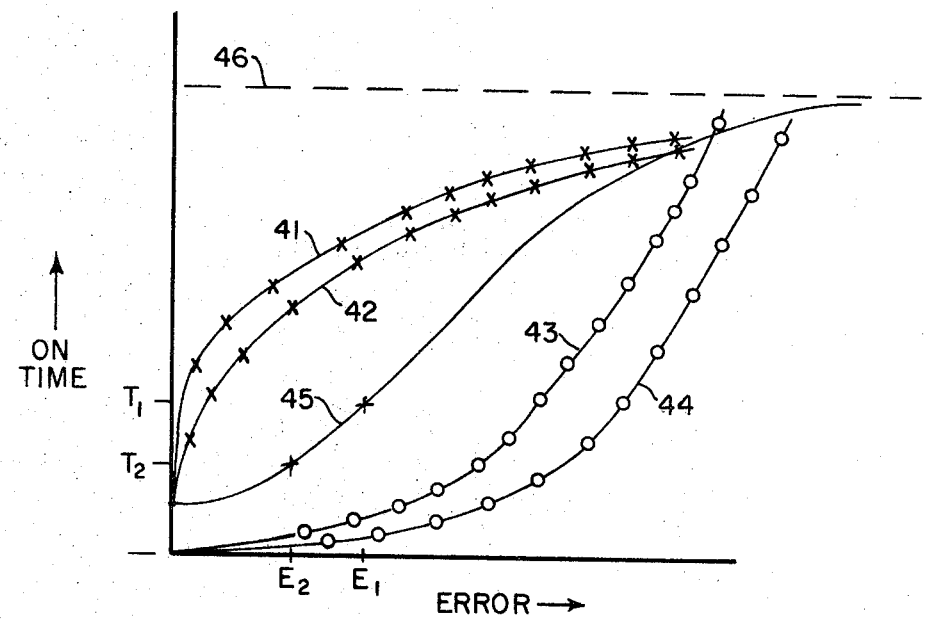
FIG. 2 is a diagram illustrating the functional relationship between several of the variables involved in the system of FIG. 1.

The graph of FIG. 2 includes a pair of plots 41 and 42 indicative of the inertia characteristics of rolling mill 13. Each of plots 41 and 42, respectively representing the performance characteristics of high and low inertia rolling mills, has a finite ON time value for zero error, to represent the backlash inherent in activating a rolling mill. There is a significant separation between the ON times of high and low inertia plots 41 and 42 for relatively small errors but the ON time difference between the two has a tendency to converge for increasingly larger errors. A relatively large difference between plots 41 and 42 exists for low errors because high inertia machines generally have a larger inherent lag than low inertia machines. For larger errors, however, plots 41 and 42 have a tendency to converge because the initial lag of the high inertia system is overcome and the rollers of a high inertia machine may actually be moving toward each other with a greater velocity than the rollers of a low inertia system if the driving motor is activated for a sufficient length of time.

Control of the time periods during which power is applied to motor 14 is also a function of the back force of sheet 11 passing between rollers 12 of rolling mill 13. Back force is a nonlinear function of material thickness and properties, such as shear modulus of elasticity. The back force characteristics of a particular type of steel are illustrated for relatively thick and thin sheets fed to rolling mill 11 by plots 43 and 44, respectively. If sheet 11 were relatively thin prior to being fed to rolling mill 13, the steel has a relatively small back force so that the amount of time necessary to actuate motor 14 is less than for thick sheets, whereby all portions of curve 44 have lower valued abscissas for corresponding valued ordinates.

In accordance with the invention, the system characteristic curves, such as plots 41 or 42, are combined with the material characteristic curves, such as plots 43 or 44, to provide a composite function that nonlinearly relates the closure or ON time of contact 17 with the error signal derived from integrator 29. An exemplary characteristic 45 is illustrated on FIG. 2 as being formed from low inertia characteristic 42 and thick sheet characteristic 43. For a zero error, contact 17 is closed for a finite time to provide for the backlash of the low inertia system. If, however, rolling mill 13 had virtually no backlash, a zero error would preclude closing of contact 17. For increasingly larger errors, the closure time of contact 17 increases until a quasi-saturation point is reached, indicated by horizontal dashed line 46.

To derive ON control signals representing the nonlinear, composite functional relation indicated by curve 45, FIG. 2, the output of thickness gauge detector 22 is coupled to function generator 51 via integrator 52, a low pass filter for removing high frequency, noise-like variations from the output of detector circuit 22. Function generator 51 broadly includes means for establishing four sets of composite curves indicative of four different thickness ranges of sheet 11 upstream of rolling mill 13. The four composite curves are functions of: thickness as a measured parameter; and mill and material characteristics as predetermined functions, which are preprogrammed into the function generator on an a priori basis.

To establish the four composite curves as a function of thickness, the output voltage of integrator 52 is applied to thickness classifying network 53. Thickness classifying network 53 includes four separate channels respectively deriving a binary one signal whenever the thickness of sheet 11 is nominally between: 10–11 mils, 11–12 mils, 12–13 mils, and 13–14 mils. The upper and lower boundaries of adjacent channels are actually separated by 0.2 mil to provide amplitude hysteresis between the channels, whereby if the thickness of sheet 11 passing between source 21 and detector 22 has a tendency to vary about the boundaries of one of the channels, the channel output indication does not change. Hence, stability of the different channel outputs is achieved.

The specific apparatus for selectively deriving one of the four thickness outputs includes four detector networks 54–57, respectively having amplitude limits indicative of 10.1–10.9 mils, 11.1–11.9 mils, 12.1–12.9 mils, and 13.1–13.9 mils. In response to the output of integrator 52 falling within any of the defined amplitude boundaries, the respective one of amplitude detectors 54–57 derives a binary one output. If the output voltage of integrator 52 lies between the boundaries of any one of detectors 54–57, none of the detectors derives a binary one output, but all derive binary zero signals.

The binary output signal generated by each of amplitude detectors 54–57 is respectively applied to the set input of bistable flip-flops 61–64. The reset inputs of flip-flops 61 and 64 are respectively driven by the outputs of amplitude detectors 55 and 56, while the reset inputs of flip-flops 62 and 63 are respectively responsive to the binary outputs of OR gates 165 and 166. OR gate 165 is responsive to the output signals of amplitude detectors 54 and 56, and OR gate 166 is coupled to the outputs of amplitude detectors 55 and 57.

To provide a better understanding as to the manner by which network 53 functions, assume, initially, that the output voltage of integrator 52 is commensurate with a thickness of 10.8 mils, whereby a binary one is derived from amplitude detector 54 and each of detectors 55–57 derives a binary zero output. The binary one output of detector 54 is coupled to the set input of flip-flop 61, whereby there is provided an indication of sheet 11 having a thickness between 10.0 and 11.0 mils. Next assume that the thickness of sheet 11 has increased to the value of 11.0 mils, whereby a zero binary level is derived from each of amplitude detectors 54–57. While a zero output voltage is derived from detector 54, bistable flip-flop 61 remains activated to the set status. Thereby, a binary one remains on the output of flip-flop 61 and a gross indication that the material thickness is approximately 10.0 to 11.0 mils is derived.

Now consider that the thickness of sheet 11 has increased to 11.2 mils, whereby detector 55 derives a binary one output and each of the other detectors generates a binary zero output. The binary one output of detector 55 is coupled to the set input of flip-flop 62 and the reset input of flip-flop 61, whereby a binary one is derived from the former flip-flop and a binary zero from the latter. Thereby, an indication is derived that sheet 11 has a thickness within the range 11 to 12 mils. Now assume that the thickness of sheet 11 decreases to a value of 10.95 mils, whereby none of detectors 54–57 derives a binary one output. Under these conditions, flip-flop 62 remains activated to the set condition and an indication is derived that the thickness of sheet 11 is in the range of 11 to 12 mils. While there is a slight error in the indication, the error is not excessive and can be tolerated. The error has a less detrimental effect on system operation than if the 10 to 11 mils channel were activated in response to a short duration fluctuation of thickness about the value of 11 mils.

Fast fluctuations in the range indications derived from network 53 are to be avoided because function generator 51 includes an electromechanical device having taps selectively connected in circuit by relays. If the relays were driven in response to slight, high frequency fluctuations in the thickness of sheet 11 about a channel boundary value, the back force indicating signal might be intermittent for a significant interval and subject to frequent step function variations. Frequent step function variations of the function generator output are to be avoided to achieve control system stabilization.

Function generator 51 includes relay network 65, responsive to the output signals of flip-flops 61–64, for selectively establishing in function generating network 66 four different composite curves. Network 66 includes slidewire potentiometer 68 and tapped resistors 69 and 70, each of which is energized with a D.C. voltage at terminal 71. Resistive elements 68–70 are selectively interconnected with each other by taps to establish a plurality of composite error versus time characteristics, such as curve 45, FIG. 2. The low inertia characteristics of mill 13, indicated by plot 42, are established by the interconnections of taps 74 and 74.1 on potentiometers 69 and 70, while the thickness characteristics are selectively established by the connections of contacts 73 to taps 74.2 on potentiometer 69. The inherent characteristics of material 11, such as shear modulus of elasticity, are established by the connections between taps 67 on slidewire 68 and contacts 73.

Figure 3:
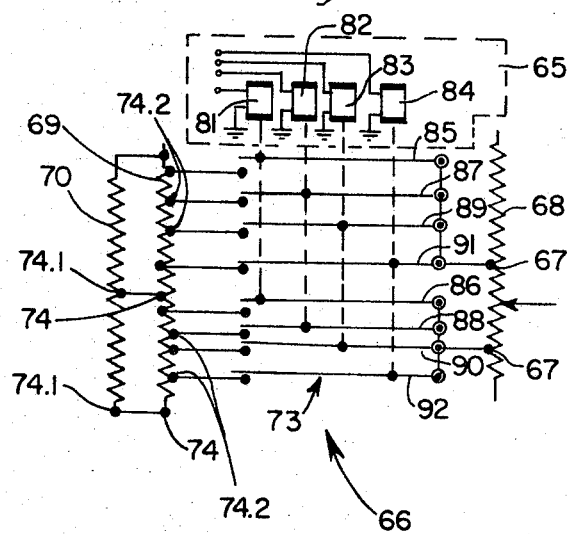
FIG. 3 is a schematic diagram of a portion of the apparatus of FIG. 1.

To provide a more complete description of the function generator network 66, reference is now made to FIG. 3, wherein there is illustrated a schematic diagram of a portion of the function generator, in combination with the circuitry of relay network 65. Relay network 65 comprises four relay windings 81–84 respectively responsive to the set output signals of flip-flops 61–64. Each of relay windings 81–84 controls a separate armature or contact in each of several groups of four contacts. In particular, energization of winding 81 closes contacts 85 and 86 into engagement with a pair of taps 74.2 on potentiometer 69; winding 82 controls engagement of armatures 87 and 88; winding 83 controls engagement of contacts 89 and 90; and winding 84 closes contacts 91 and 92. Each of contacts 85, 87, 89 and 91 is short circuited to the same tap point 67 on potentiometer 68, while contacts 86, 88, 90 and 92 are connected to a different tap point 67 on the potentiometer.

In response to activation of one of windings 81–84, the normally open circuit contacts thereof are closed to establish a composite curve, such as curve 45, FIG. 2. In response to a different one of windings 81–84 being activated, a different set of connections between taps 74 and 67 is established and a second composite curve is established.

Up to the present, consideration has been given to the manner by which four composite curves, such as curve 45, are established by means of function generator 66. ON time control of contact 17 is also a function of the error output voltage of integrator 29. To establish a voltage indicative of the error magnitude, as well as the back force and mill function, a portion of the voltage across slidewire 67 is derived as a function of the position of potentiometer slider 93. Slider 93 is driven in response to the absolute value of the error signal derived by integrator 29 by means of a rebalancing network comprising difference network 94, motor 95 and rebalance potentiometer 96, having a high potential terminal 97 connected to a negative D.C. source. The absolute value of the error signal is derived by network 98 so that the slider 93 is driven as a function of error signal magnitude and not polarity, to decrease the complexity of function generating potentiometer 66.

The voltage at slider 93, indicative of the amount of time that motor 14 should be driven to eliminate the error in the thickness of sheet 11 emerging from rolling mill 13, is fed to a pulse width modulating network that controls the ON and OFF periods of contact 17 and motor 14. The OFF period of motor 14 is determined by the transport lag time between rolling mill 13 and the thickness gauge comprising source 23 and detector 24. The OFF time of motor 14 is correlated with the transport lag between rolling mill 13 and the gauge station including detector 24 to enable the effect of any corrective action taken by rollers 12 to be analyzed prior to making a further correction. To measure the transport lag time between rolling mill 13 and detector 24, the velocity of sheet 11 passing through the rolling mills is determined by coupling shaft 101 of tachometer generator 102 to roller 12. Tachometer generator 102 responds to the rotational velocity of shaft 101 to derive a variable amplitude D.C. output voltage directly proportional to the velocity of sheet 11 as it passes through rolling mill 13. Since the distance between rolling mill 13 and detector 24 is known, the velocity indicating output of tachometer generator 102 can be correlated with the travel time of sheet 11 between the rolling mill and detector station such that the tachometer generator output voltage amplitude is directly proportional to the sheet travel time between the rolling mill and detector.

The variable amplitude control signals derived from tachometer generator 102 and slider 93 are combined in network 103, the output of which is a series of rectangular waves, having zero and negative values respectively controlling closing and opening (ON and OFF times) of contact 17. Network 103 comprises a pair of single shot pulse width modulators 104 and 105, preferably conventional monostable multi-vibrators that are driven to an astable state for a time period directly proportional to the amplitude of a D.C. voltage coupled thereto. The astable state of modulators 104 and 105 is derived immediately upon the coupling of the D.C. voltage thereto. The modulators remain in a stable state indefinitely until the inputs thereof are again responsive to a D.C. voltage ON time pulse width modulator 104 is connected to be responsive to the voltage derived at slider 93 through the connection established by normally closed contact 106 of switch 107. The negative trailing edge of the output waveform of pulse width modulator 104 is detected by differentiating and rectifying network 108, which feeds a short duration pulse through OR gate 109 to close the normally open contacts 111 of switch 112. Switch 112 selectively couples the time indicating D.C. output signal of tachometer generator 102 to the input of OFF pulse width modulator 105, the output of which is coupled in parallel to: the input of OR gate 109; the control terminal of switch 107; and winding 113. Winding 113 responds to the output voltage of pulse width modulator 105 so that contact 17 is closed in response to the modulator deriving a zero voltage, while the contact is open circuited in response to a negative, finite voltage being derived by the OFF pulse width modulator.

To provide a more complete understanding as to the manner by which network 103 functions, assume that pulse width modulator 105 is deriving a zero voltage, whereby contact 106 of switch 107 is closed and zero voltages are applied to the inputs of OR gate 109, to open contact 111 of switch 112. Under the stated conditions, the D.C. voltage at slider 93, indicative of the computed ON time for contact 17, is coupled to the input of pulse width modulator 104. Pulse width modulator 104 responds to the voltage on slider 93 to derive a zero output signal for a time period directly proportional to the voltage fed thereto. Upon the completion of the time interval proportional to the voltage at slider 93, pulse width modulator 104 is switched to the stable state, whereby the ON pulse width modulator output voltage suddenly changes to a negative, finite voltage.

In response to the negative change in the output voltage of pulse width modulator 104, differentiating and rectifying network 108 generates a negative pulse that is coupled through OR gate 109 to close contact 111 of switch 112. Closure of contact 111 couples the time indicating output voltage of tachometer generator 102 to the input of pulse width modulator 105, whereby the OFF pulse width modulator is switched from a zero level to a finite negative level. The finite negative level output voltage of pulse width modulator 105 is coupled back through OR gate 109 so that switch 111 remains closed to couple the output of tachometer generator 102 to the input of modulator 105 after the negative voltage from differentiating and rectifying network 108 has subsided. The negative level derived from pulse width modulator 105 is also coupled to switch 107, to open circuit contact 106 and decouple the input of pulse width modulator 104 from slider 93.

As time progresses, pulse width modulator 105 returns to the stable state and a zero level output voltage is derived thereby. The zero level output voltage of modulator 105 results in contacts 106 and 111 being respectively activated to the closed and open circuit conditions, whereby the voltage at slider 93 is again coupled to the input of pulse width modulator 104 and the output voltage of tachometer generator 102 is decoupled from the input to pulse width modulator 105. Hence, there is derived from pulse width modulator 105 a series of variable time duration zero and negative voltage levels for driving contact 17 to the closed and open circuit conditions, respectively.

Under certain conditions, to prevent overshoot, it is desirable to activate motor 14 for only a fraction of the ON and OFF periods indicated by the voltages derived from slider 93 and tachometer generator 102. To this end, the output voltages of slider 93 and tachometer generator 102 are attenuated by like amounts in resistive voltage dividers internally connected within pulse width modulators 104 and 105. If, for example, it is a desideratum to activate mortor 14 for a time period that is only one-third of the periods indicated by the voltages derived from slider 93 and tachometer generator 102, a one-third voltage divider is connected in the input circuit of each of pulse width modulators 104 and 105. The ON and OFF times of motor 14 are controlled to optimize the speed of response of rolling mill 13 without preventing overshoot.

To provide a more complete understanding as to the manner by which the present invention functions, consider the system operation by assuming that the thickness of sheet 11 downstream of rollers 12 is greater than a set point and the back force of material 11 and the characteristics of rolling mill 13 are given by composite curve 45, FIG. 2. Under the stated conditions, the response of function generator 66 as a function of the position of slider 93 is illustrated by FIG. 2 wherein error in FIG. 2 is equated to the position of slider 93. Integrator 29 derives a negative output voltage, $-E_1$, that is sensed by polarity detector 31 which in turn activates contact 16 to a connection with the negative terminal of D.C. source 15, enabling rollers 12 to be driven toward each other by motor 14.

The $-E_1$ output voltage of integrator 29 energizes motor 95 so that the voltage derived at slider 93 has a value $T_1$, FIG. 2. The $T_1$ voltage is fed to network 103 and is combined with the transport lag indicating output voltage of tachometer generator 102, having an assumed value of $T_3$. Network 103 responds to the $T_1$ signal amplitude on tap 93 to derive a zero level voltage for a period of $T_1$ seconds, whereby contacts 17 are closed and motor 14 drives rollers 12 together for a time period $T_1$.

After rollers 12 have been driven toward each other for a period of $T_1$ seconds, pulse width modulator 105 is activated to derive a negative voltage level for a period $T_3$, commensurate with the transport lag between rolling mill 13 and detector 24. During the $T_3$ period, contacts 17 are open and rollers 12 remain at the same position as they occupied at the end of the $T_1$ interval.

After the $T_3$ transport lag period has been completed, the thickness of that portion of sheet 11 within rollers 12 at the end of the $T_1$ period is measured by detector 24. The output of detector 24 now differs from the set point voltage at slider 25 after the $T_3$ transport lag by the error signal $E_2$, FIG. 2. Thereby, a lower voltage is derived from slider 93 and a reduced ON time for contacts 17 is achieved. In the manner described, therefore, it becomes evident that the closure time of contacts 17 is continually decreased for reducing errors.

As long as the thickness of sheet 11 upstream of rolling mill 13 is within a predetermined boundary, the error voltage derived from integrator 29 is correlated with the closure time of contacts 17 as indicated by composite characteristic 45. If, however, the thickness of sheet 11 were to change to a value outside of the predetermined value, the curve shape of function generator 66 would be correspondingly altered to reflect a different back force function of the steel sheet 11 being milled. To this end, amplitude detectors 54–57 respond to the output of integrator 52, as indicated supra, to change the connections between taps 67 and 74 and establish a composite curve different from composite curve 45 illustrated by FIG. 2. Slider 93 is driven along the different voltage gradient on slidewire 68 in exactly the same manner as indicated supra in response to the error voltage indication of the thickness of sheet 11 downstream of rolling mill 13.

While there has been described and illustrated one specific embodiment of the invention, it will be clear that variations in the details of the embodiment specifically illustrated and described may be made without departing from the true spirit and scope of the invention as defined in the appended claims. For example, the analog computer function generator can be replaced with a digital computer table look-up memory. Further, the ON and OFF periods of contacts 17 can be controlled by hand in response to indications thereof derived by the output voltages of the function generator and tachometer. According to a further modification, the nonlinear composite curves can be established with a single tapped potentiometer in response to empirical determinations of the processor ON time versus error characteristics for families of sheet thickness.

The nonlinear functions can be established for other measurements and processes than the one specifically described. For instance, hardness of the material entering a processor can be the function setting control parameter. If the invention is utilized in conjunction with a plastic extruder or rubber calender, the density of plastic or rubber prior to processing can be monitored with a back scatter detecting penetrating radiation gauge to establish the nonlinear functions.

I claim:

1. In a controller for a material processor, gauge means for deriving first and second signals respectively indicative of properties of the material prior and subsequent to the material passing through the processor, means responsive to said second signal for deriving an error signal, means responsive to the first signal for selecting one of a plurality of nonlinear functions of the amount by which the processor must be varied as a function of the error signal to reduce the error signal to zero, means for correlating the error signal with said amount in accordance with the selected function to derive a control signal, and means responsive to said control signal for energizing drive means of the processor.

2. The controller of claim 1 wherein said energizing means includes means for driving the controller for a variable time period in response to the control signal amplitude.

3. The controller of claim 2 wherein said energizing means includes means for disabling the controller drive means for a time period indicative of the speed the material moves through the reducing machine.

4. The controller of claim 3 wherein said control signal is a function of properties of the material.

5. The controller of claim 4 wherein said control signal is a function of the system response time.

6. The controller of claim 3 wherein said control signal is a function of the system response time.

7. The controller of claim 3 further including means for monitoring the speed of the material for controlling the disabling means.

8. The controller of claim 3 wherein said driving means and said disabling means respectively actuate the controller for periods commensurate with identical multiples of the control signal amplitude and material speed.

9. The controller of claim 8 wherein said multiples equal unity.

10. The controller of claim 8 wherein said multiples are less than unity.

11. The controller of claim 2 wherein said selected means includes means for changing the function only in response to the first signal amplitude varying beyond predetermined finite limits.

12. The controller of claim 11 wherein said control signal is a function of the material type.

13. The controller of claim 12 wherein said control signal is a function of the processor response time.

14. The controller of claim 11 wherein said control signal is a function of the processor response time.

15. The controller of claim 1 wherein said material is a constant density sheet; said processor includes means for reducing the thickness of said sheet; said gauge means includes means for measuring the thickness of the sheet prior and subsequent to the sheet passing through the reducing means; and said functions are composite characteristics dependent upon inherent properties of the material and reducing means.

16. A method of actuating a controller for a material processor comprising the steps of measuring properties of the material prior and subsequent to the material being treated by the processor, deriving an indication of the deviation between a property value of the material emerging from the processor relative to a preset property value, in response to the property measurement made prior to the material being treated selecting one of a plurality of nonlinear functions indicating the amount by which the processor must be varied as function of the deviation, and correlating said amount with the deviation indication to derive an indication of the amount by which the reducing means should be activated to achieve the desired thickness.

17. The method of claim 16 further including the step of activating a drive for the processor for a time period proportional to said amount indication.

18. The method of claim 17 wherein the material is moving after it has emerged from the processor further including the step of maintaining the drive in a disabled state for a time period proportional to the speed of the moving material, wherein the activating and disabling time periods have the same proportionality constant.

19. The method of claim 18 wherein the proportionality constant equals unity.

20. The method of claim 18 wherein the proportionality constant is less than unity and is selected to prevent overshoot of the processor.

21. The method of claim 16 wherein the nonlinear function is a function of a property of the processor.

22. The method of claim 21 wherein the nonlinear function is a function of an inherent property of the material.

23. The method of claim 16 wherein the nonlinear function is a function of an inherent property of the material.

24. In a controller for a material processor, gauge means for deriving first and secod signals respectively indicative of properties of the material prior and subsequent to the material passing through the processor, means responsive to said second signal for deriving an error signal, means responsive to the first signal for selecting one of a plurality of nonlinear functions of the amount by which the processor must be varied as a function of the error signal to reduce the error signal to zero, and means for correlating the error signal with said amount in accordance with the selected function to derive a control signal.

25. The controller of claim 24 wherein said material is a constant density sheet; said processor includes means for reducing the thickness of said sheet; said gauge means includes means for measuring the thickness of the sheet prior and subsequent to the sheet passing through the reducing means; and said functions are composite characteristics dependent upon inherent properties of the material and reducing means.

26. A system for deriving an indication of a parameter of a material being treated by a processor comprising gauge means for deriving a signal indicative of a property of the material prior to the material being treated by the processor, and means responsive to the signal for selecting one of a plurality of predetermined nonlinear functions indicative of the amount by which the processor must be varied as a function of an error signal between a desired value of the property parameter after the material has been treated by the processor to reduce the error signal to zero.

27. A method of deriving an indication of the force required to be applied by a thickness reducing machine to a constant density material being fed to the machine comprising the steps of measuring the thickness of the material prior to the material being fed into the reducing machine, and determining the force indication as a predetermined nonlinear function of the thickness measurement, said function being related to a predetermined inertia characteristic of the machine.

28. The method of claim 25 wherein the function is also derived in response to an indication of an inherent property of the material.

29. In combination, a machine for reducing the thickness of a moving constant density sheet, gauge means positioned on each side of the reducing machine for deriving first and second signals respectively indicative of the material thickness prior and subsequent to the material passing through the reducing machine, means responsive to said second signal for deriving an error signal, nonlinear function generator means responsive to said first and error signals for deriving a control signal, and means for controlling the machine in a manner tending to reduce the error signal in response to said control signal.

References Cited

UNITED STATES PATENTS

| | | | |
|---|---|---|---|
| 3,197,986 | 8/1965 | Freedman et al. | 72—9 |
| 3,332,263 | 7/1967 | Beadle et al. | 72—10X |

MILTON S. MEHR, Primary Examiner

U.S. Cl. X.R.

72—10, 16